(12) United States Patent
Taki (10) Patent No.: US 11,500,541 B2
(45) Date of Patent: Nov. 15, 2022

(54) MEMORY SYSTEM AND CONTROLLING METHOD

(71) Applicant: Kioxia Corporation, Tokyo (JP)

(72) Inventor: Daisuke Taki, Yokohama (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 17/198,429

(22) Filed: Mar. 11, 2021

(65) Prior Publication Data

US 2022/0066636 A1 Mar. 3, 2022

(30) Foreign Application Priority Data

Aug. 27, 2020 (JP) .............................. JP2020-143307

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
USPC ........................................................ 711/154
See application file for complete search history.

(56) References Cited

U.S. PATENT DOCUMENTS

| | | | |
|---|---|---|---|
| 10,120,809 B2 | 11/2018 | Arellano et al. | |
| 2011/0085445 A1* | 4/2011 | Klincewicz | H04L 45/00 370/400 |
| 2017/0091108 A1 | 3/2017 | Arellano et al. | |
| 2019/0235924 A1 | 8/2019 | Duluk, Jr. et al. | |
| 2020/0065290 A1* | 2/2020 | Natu | H04L 12/40097 |
| 2020/0136996 A1 | 4/2020 | Li et al. | |
| 2021/0019069 A1* | 1/2021 | Sen | H05K 5/0204 |
| 2021/0200548 A1* | 7/2021 | Shan | G06F 3/0679 |

\* cited by examiner

*Primary Examiner* — Charles Rones
*Assistant Examiner* — Jonah C Krieger
(74) *Attorney, Agent, or Firm* — Oblon, McClelland, Maier & Neustadt, L.L.P.

(57) ABSTRACT

According to one embodiment, a memory system is connectable to a host as a type 3 compute express link (CXL) device. A controller of the memory system packs, at a CXL link layer, a response command with data (DRS) and/or a response command without data (NDR), received from an upper CXL transaction layer, into a flit including four slots, and transmits the response command to a lower CXL ARB/MUX layer, and selects, based on a remaining number of data slots of DRS packed in a first flit that has been transmitted to the CXL ARB/MUX layer, a remaining number of DRS, a remaining number of NDR, and a number of empty slots in a second flit to be transmitted subsequently to the CXL ARB/MUX layer, a format to be used in slots in a second flit.

12 Claims, 7 Drawing Sheets

(A) [Protocol Flit]: Including Header Slot x 1 + Generic Slots x 3 and capable of packing commands and data (B) [All Data Flit]: All Slots are constituted by data 1 Flit = 64 Byte = 4 Slot (16 Byte)

| Format to Req Type Mapping | D2H / S2M Type | Size |
|---|---|---|
| H0 | CXL.cache Data Header + 2 CXL.cache Resp + CXL.mem NDR | 85 |
| H1 | CXL.cache Req + CXL.cache Data Header | 96 |
| H2 | 4 CXL.cache Data Header + CXL.cache Resp | 88 |
| H3 | CXL.mem DRS Header + CXL.mem NDR | 68 |
| H4 | 2 CXL.mem NDR | 56 |
| H5 | 2 CXL.mem DRS Header | 80 |
| G0 | CXL.cache / CXL.mem Data Chunk | 128 |
| G1 | CXL.cache Req + 2 CXL.cache Resp | 119 |
| G2 | CXL.cache Req + CXL.cache Data Header + CXL.cache Resp | 116 |
| G3 | 4 CXL.cache Data Header | 68 |
| G4 | CXL.mem DRS Header + 2 CXL.mem NDR | 96 |
| G5 | 2 CXL.mem NDR | 56 |
| G6 | 3 CXL.mem DRS Header | 120 |

MEMORY SYSTEM AND CONTROLLING METHOD

CROSS-REFERENCE TO RELATED APPLICATIONS

This application is based upon and claims the benefit of priority from Japanese Patent Application No. 2020-143307, filed Aug. 27, 2020, the entire contents of which are incorporated herein by reference.

FIELD

Embodiments described herein relate generally to a memory system and a controlling method.

BACKGROUND

Compute Express Link (CXL), which is one of the host interface standards, has recently attracted attention. The CXL defines a CXL transaction layer, a CXL link layer, a CXL ARB/MUX layer and a Flex Bus PHY layer. In a memory system such as a storage class memory (SCM) configured as a CXL device, in the CXL link layer, a response command with data (DRS: data response) and a response command without data (NDR: no data response), which are received from the upper CXL transaction layer, are packed in Flit and transmitted to the lower CXL ARB/MUX layer. The efficiency of transmission from the CXL device to the host depends on the Flit packing in the CXL link layer. In the memory system configured as a CXL device, the DRS is used, for example, to respond to a read command, and the NDR is used, for example, to respond to a write command.

DETAILED DESCRIPTION

In general, according to one embodiment, a memory system is connectable to a host as a type 3 compute express link (CXL) device via an interface conforming to a CXL standard. The memory system includes a nonvolatile memory and a controller. The controller controls writing of data to the nonvolatile memory or reading of data from the nonvolatile memory in response to a command from the host. The controller packs, at a CXL link layer, a response command with data (DRS: data response) and/or a response command without data (NDR: no data response), received from an upper CXL transaction layer, into a flit including four slots, and transmit the response command to a lower CXL ARB/MUX layer, and selects, based on a remaining number of data slots of DRS packed in a first flit that has been transmitted to the CXL ARB/MUX layer, a remaining number of DRS, a remaining number of NDR, and a number of empty slots in a second flit to be transmitted subsequently to the CXL ARB/MUX layer, a format to be used in slots in the second flit.

An embodiment will be described below with reference to the drawings.

Figure 1:
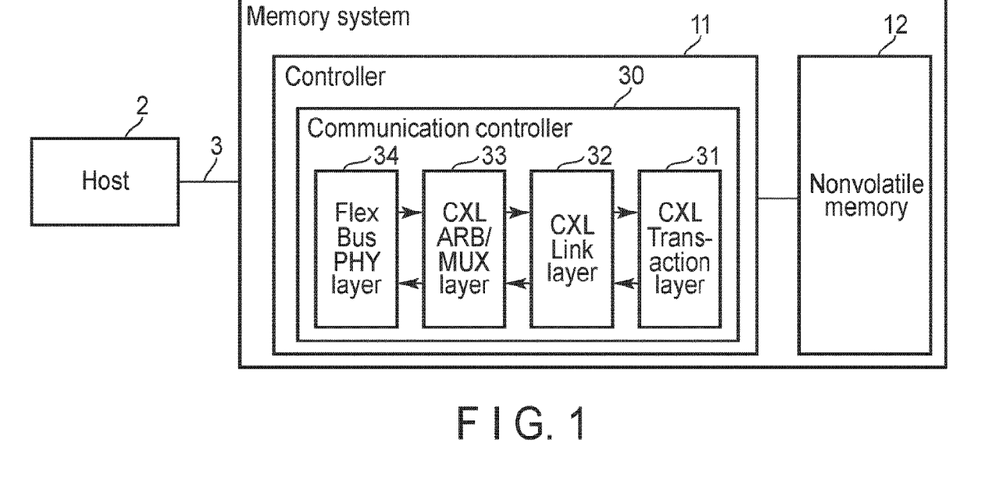
FIG. 1 is a diagram showing an exemplary configuration of a memory system of an embodiment.

FIG. 1 is a diagram showing an exemplary configuration of a memory system 1 of the embodiment. In addition, FIG. 1 shows an exemplary configuration of an information processing system including the memory system 1, a host 2 connected to the memory system 1, and an interface 3 connecting the memory system 1 and the host 2.

The memory system 1 may be implemented as a variety of types of storage device. In the example shown in FIG. 1, the memory system 1 is implemented as an SCM. The interface 3 conforms to the CXL standard. That is, the memory system 1 is configured as a CXL device. The host 2 is an information processing device such as a personal computer and a server.

The memory system 1 includes a controller 11 and a nonvolatile memory 12. The controller 11 is configured as a system on a chip (SoC), for example. The nonvolatile memory 12 is a NAND flash memory, for example.

Based on the commands issued by the host 2, the controller 11 writes data, which is transmitted from the host 2, to the nonvolatile memory 12 and reads data, which is requested by the host 2, from the nonvolatile memory 12. That is, the controller 11 controls the nonvolatile memory 12 based on the commands issued by the host 2.

The controller 11 includes a communication controller 30. The communication controller 30 controls communication with the host 2 via the interface 3. The communication controller 30 includes a CXL transaction layer 31, a CXL link layer 32, a CXL ARB/MUX layer 33, and a Flex Bus PHY layer 34.

Figure 4:
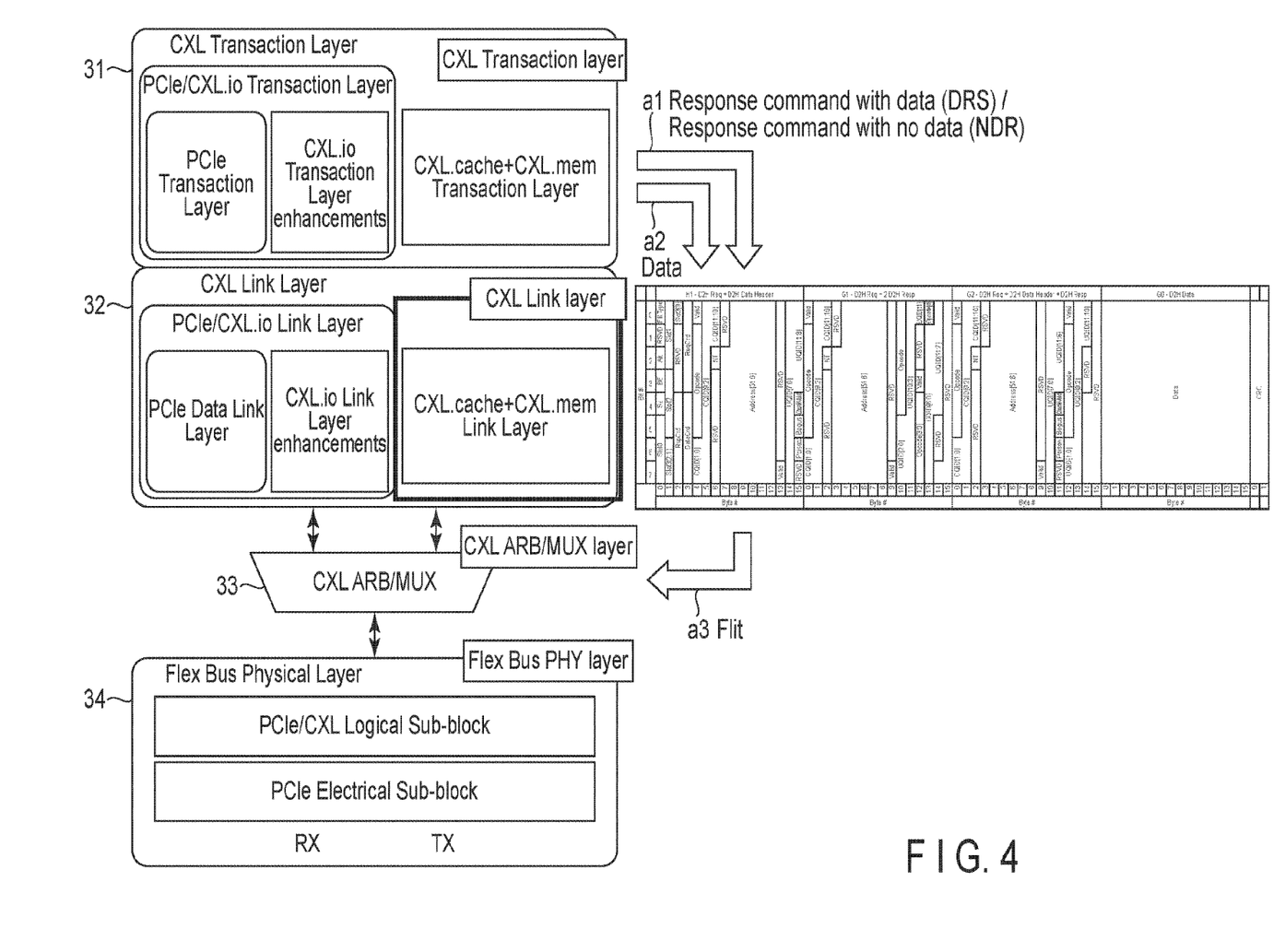
FIG. 4 is a diagram showing an overview of commands and data packing in the CXL link layer.

The CXL transaction layer 31 includes a PCIe/CXL.io transaction layer and a CXL.cache+CXL.mem transaction layer (see FIG. 4). In the PCIe.CXL.io transaction layer, a process related to transaction layer packet (TLP) is performed. In the CXL.cache+CXL.mem transaction layer, a process related to a CXL.cache command or a CXL.mem command is performed. The TLP, CXL.cache command and CXL.mem command are transmitted to and received from the CXL transaction layer at the other end communication partner.

The CXL link layer 32 manages a link included in the interface 3 to connect devices. The CXL link layer 32 includes a PCIe/CXL.io link layer and a CXL.cache+CXL.mem link layer (see FIG. 4). In the PCIe/CXL.io link layer, a process related to Data Link Layer Packet (DLLP) is performed. In the CXL.cache+CXL.mem link layer, a process related to Link Layer Control flit is performed. The DLLP and Link Layer Control flit are flits which are transmitted to and received from the CXL link layer at the other end communication partner.

The CXL ARB/MUX layer 33 is interposed between the CXL link layer 32 and the Flex Bus PHY layer 34 to perform a process of superposing the Flit from the PCIe/CXL.io link layer and the Flit from the CXL.cache+CXL.mem link layer, which are included in the CXL link layer 32, and transmitting the superposed flits to the Flex Bus PHY layer 34, a process of arranging the transmission of Flit from the PCIe/CXL.io link layer to the Flex Bus PHY layer 34 and that of Flit from the CXL.cache+CXL.mem link layer to the Flex Bus PHY layer 34, a process of distributing the Flit from the Flex Bus PHY layer 34 to the PCIe/CXL.io link layer or the CXL.cache+CXL.mem link layer, and the like.

The Flex Bus PHY layer 34 performs an interface operation of transmitting data physically via a plurality of lanes included in the link of the interface 3. Each of the lanes includes a differential signal line pair (Tx+, Tx−) for transmission and a differential signal line pair (Rx+, Rx−) for reception. The Flex Bus PHY layer 34 includes a PCIe/CXL Logical Sub-block and a PCIe Electrical Sub-block (see FIG. 4).

Figure 2:
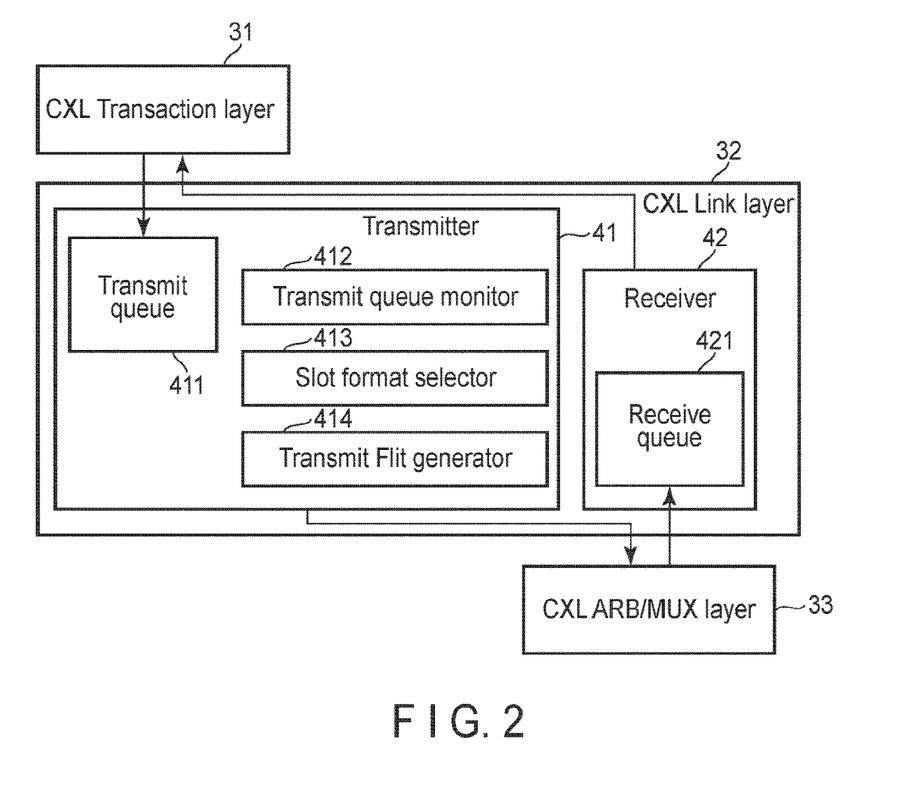
FIG. 2 is a diagram showing an exemplary configuration of a CXL link layer in the memory system of the embodiment.

FIG. 2 is a diagram showing an exemplary configuration of the CXL link layer 32 in the memory system 1 of the preset embodiment. The CXL link layer 32 includes a transmitter 41 and a receiver 42.

The transmitter 41 packs the commands received from the CXL transaction layer 31 into the Flit and transmits it to the CXL ARB/MUX layer 33. The commands received are DRS and NDR. In the memory system 1 of the present embodiment, the DRS is used, for example, to respond to a read command, and the NDR is used, for example, to respond to a write command. The transmitter 41 includes a transmit queue 411 to store commands temporarily from the CXL transaction layer 31. The CXL transaction layer 31 queues DRS and NDR to the transmit queue 411 to transfer them to the CXL link layer 32.

The receiver 42 transmits a command from the Flex Bus PHY layer 34, which is received via the CXL ARB/MUX layer 33 to the CXL transaction layer 31. This command is, for example, a read command and a write command which are issued from the host 2. The receiver 42 includes a receive queue 421 to temporarily store data from the Flex Bus PHY layer 34.

The transmitter 41 of the CXL link layer 32 includes a transmit queue monitor 412, a slot format selector 413, and a transmit Flit generator 414.

The transmit queue monitor 412 refers to the transmit queue 411 to acquire the remaining number of data slots of the DRS packed in the flit (flit before the current flit) that has been transmitted to the CXL ARB/MUX layer 33, the remaining number of DRS and the remaining number of NDR. Based on the remaining number of data slots, the remaining number of DRS and the remaining number of NDR, which are acquired by the transmit queue monitor 412, and the number of empty slots of the flit (current flit) to be transmitted to the CXL ARB/MUX layer 33, the slot format selector 413 selects a format (slot format) to be used for the slots in the current flit. The transmit Flit generator 414 uses the slot format selected by the slot format selector 413 to generate flit to be transmitted to the CXL ARB/MUX layer 33. In the memory system 1 of the present embodiment, both the transmit queue monitor 412 and the slot format selector 413 attain efficient flit packing in the CXL link layer 32. The details thereof will be described later.

Figure 3:
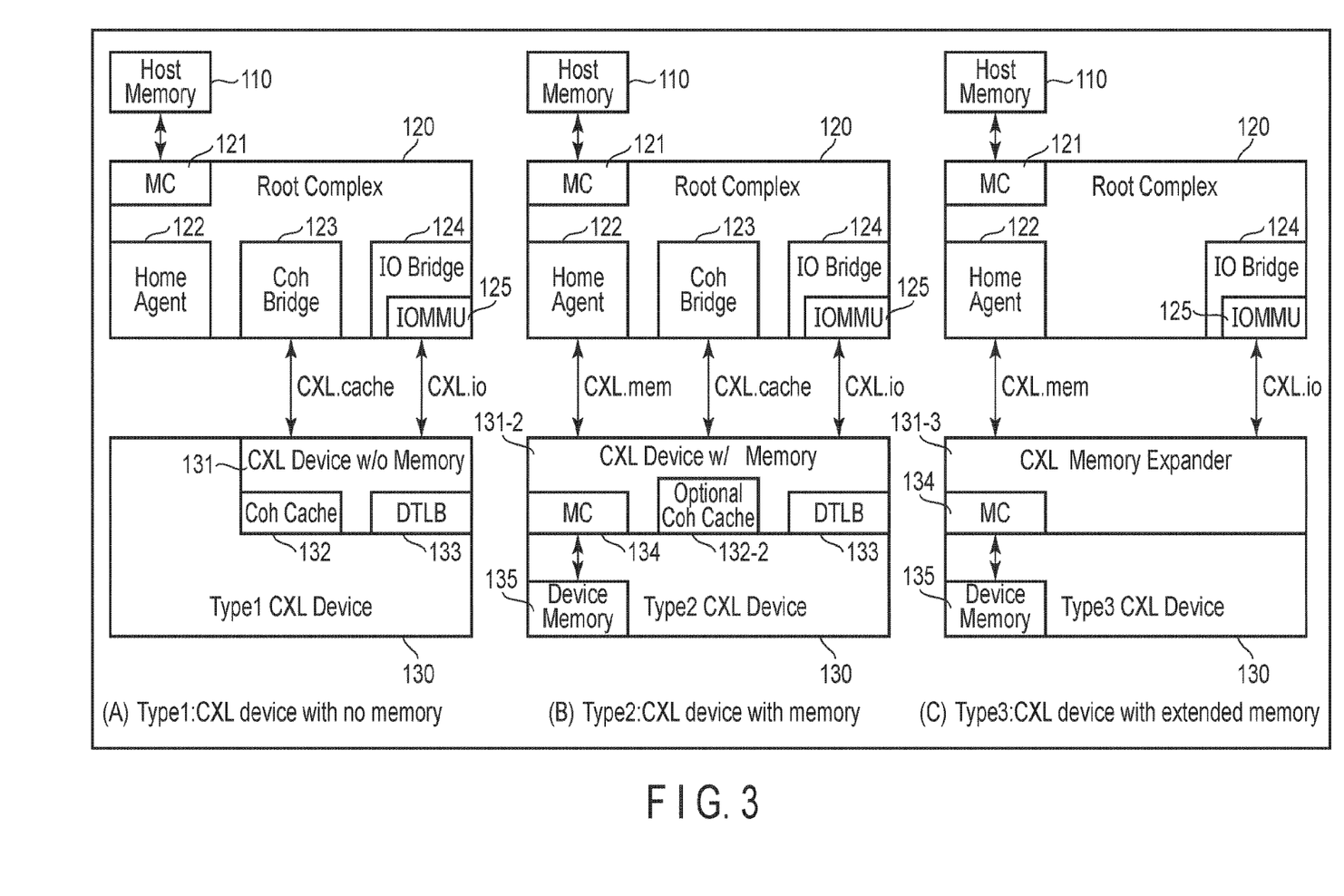
FIG. 3 is a diagram showing types (Type 1, Type 2, Type 3) of a CXL device.

FIG. 3 is a diagram showing types (Type 1, Type 2, Type 3) of the CXL device.

The CXL device is configured as one of Type 1, Type 2 and Type 3. In FIG. 3, (A) is a functional block diagram of the CXL device of Type 1 with no memory, (B) is a functional block diagram of the CXL device of Type 2 with memory, and (C) is a functional block diagram of the CXL device of Type 3 with extended memory. In FIG. 3, a rectangle 130 is a CXL device configured as one of Type 1, Type 2 and Type 3. Rectangles 110 and 120 are a host memory and a root complex, respectively, which are connected to the CXL device.

The root complex 120 is a module interposed between the host memory 110 and the CXL device 130 to implement an accelerator function and the like described later. The root complex 120 includes a memory controller (MC) 121, a home agent 122, a coherency [Coh] bridge 123 and an input/output (IO) bridge 124. The IO bridge 124 includes an IO MMU 125.

The MC 121 controls communication with the host memory 110. The home agent 122, Coh bridge 123 and IO bridge 124 each control communication with the CXL device 130. Between the root complex 120 and the CXL device 130, three communications of CXL.mem, CXL.cache and CXL.io can be performed. The home agent 122 functions as a host of CXL.mem. The Coh bridge 123 functions as a host of CXL.cache. The IO bridge 124 functions as a host of CXL.io. The CXL.mem and CXL.cache, and the CXL.io are processed by different modules in the CXL transaction layer 31 and the CXL link layer 32. Specifically, the CXL.mem and CXL.cache are processed by the CXL.cache+CXL.mem transaction layer in the CXL transaction layer 31 and the CXL.cache+CXL.mem link layer in the CXL link layer 32, while the CXL.io is processed by the PCIe/CXL.io transaction layer in the CXL transaction layer 31 and the PCIe/CXL.io link layer in the CXL link layer 32.

The CXL.mem is communication for the CXL device 130 to provide the host with an extended memory. Specifically, it is communication for allowing the host to use part or all of a device memory 135 in the CXL device 130 as if they were the host memory 110.

The CXL.cache is communication for implementing an accelerator function of the CXL device 130 to operate by coherent caching the host memory 110 or the host memory 110 and/or the device memory 135.

The CXL.io is communication between the host (host memory 110) and the CXL device 130 mainly for transmitting and receiving information about device state management, such as device detection and initialization, instructions to make transition to a low power mode, and notification of recovery.

The CXL device of Type 1 has an accelerator function to operate by coherently caching the host memory 110. With this accelerator function, the device memory 135 is not coherently cached. In addition, the CXL device of Type 1 does not provide the host with an extended memory. The CXL device of Type 1 includes a CXL device w/o memory 131 that executes CXL.cache and CXL.io. The CXL device w/o memory 131 includes a Coh Cache 132 and a DTLB 133 to implement an accelerator function.

The CXL device of Type 2 has an accelerator function to operate by coherently caching the host memory 110 and/or the device memory 135. This accelerator function makes it possible to set whether the device memory 135 as well as the host memory 110 is coherently cached. The CXL device of Type 2 provides the host with an extended memory. The CXL device of Type 2 includes the device memory 135 and a CXL device w/ memory 131-2 that executes CXL.mem, CXL.cache and CXL.io. The CXL device w/ memory 131-2 includes a memory controller (MC) 134 for controlling communication with the device memory 135, and an optional Coh cache 132-2 and DTLB 133 for implementing the accelerator function. The optional Coh cache 132-2 has a function of setting whether the device memory 135 is coherently cached.

The CXL device of Type 3 does not have any equivalent for the accelerator functions of the CXL devices of Types 1 and 2, but provides the host with an extended memory. The CXL device of Type 3 includes the device memory 135 and a CXL memory expander 131-3 that executes CXL.mem and CXL.io. The CXL memory expander 131-3 includes an MC 134 for controlling communication with the device memory 135.

The memory system 1 of the present embodiment is configured as the foregoing CXL device of Type 3. That is, in the memory system 1, the CXL.mem and CXL.io shown in (C) of FIG. 3C are executed.

FIG. 4 is a diagram showing an overview of commands and data packing in the CXL link layer 32.

As described above, in the CXL link layer 32, the commands received from its upper CXL transaction layer 31 are DRS and NDR. The DRS is used, for example, to respond to a read command, and the NDR is used, for example, to respond to a write command.

The CXL link layer 32 packs the DRS or NDR command (a1) received from the CXL transaction layer 31 and the DRS data (a2) into a 64-byte Flit (a3) and transmits it to the lower CXL ARB/MUX layer 33. To pack them, the CXL link layer 32 divides the Flit into four slots. Each of the slots is 16 (64/4) bytes. The CXL link layer 32 thus packs the commands and data separately into the slots of the Flit. In other words, both the commands and data cannot be packed into one slot. A plurality of commands can be packed into one slot. The data is packed into one or more flits each having a fixed length of 64 bytes and divided into four slots.

The efficiency of transmission from the memory system 1 to the host 2 via the interface 3 depends on the packing into the Flit in the CXL link layer. The memory system 1 of the present embodiment thus achieves efficient packing into the Flit in the CXL link layer.

Figure 5:
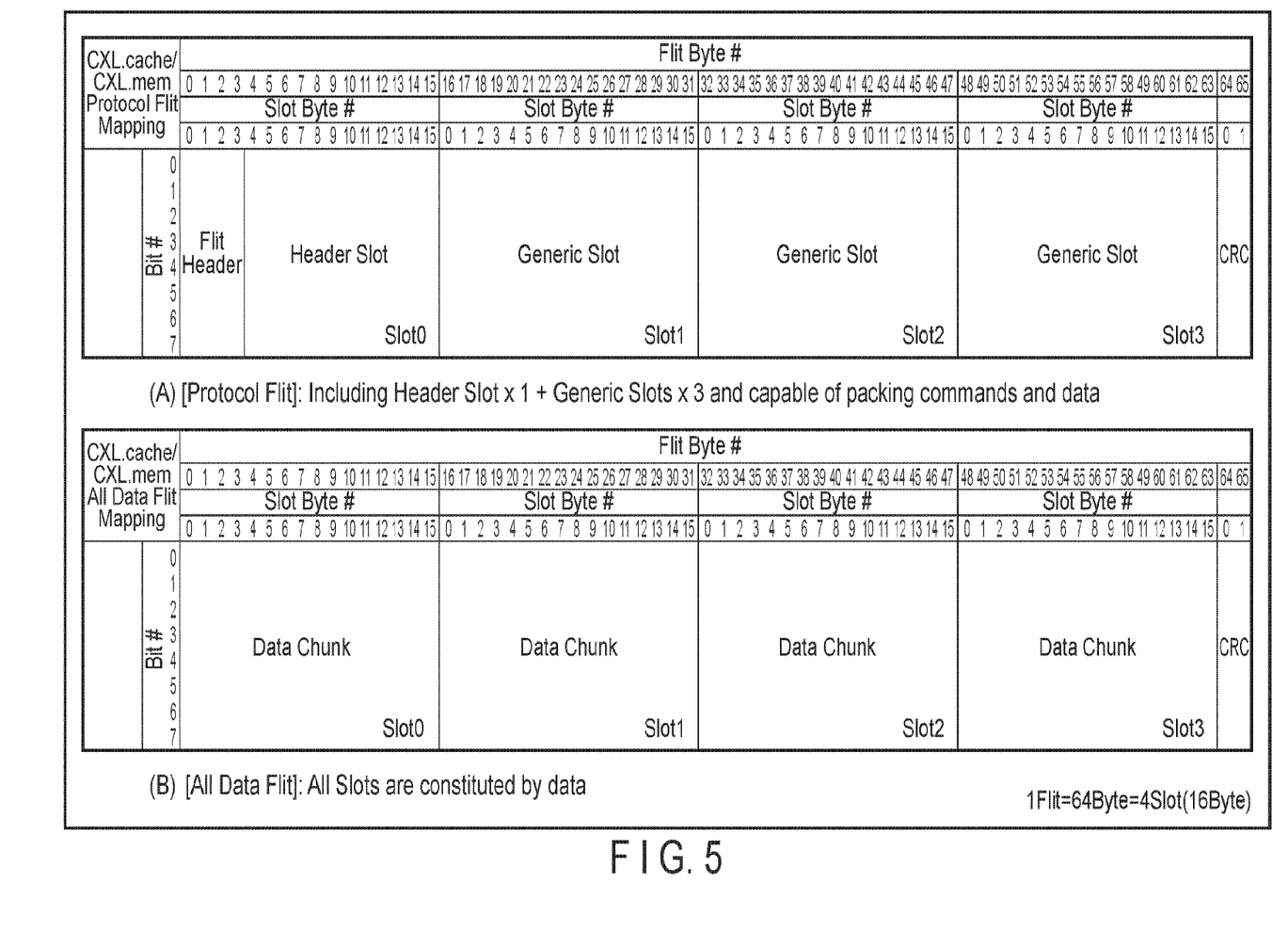
FIG. 5 is a diagram showing a configuration of flits (protocol flit, all data flit) used in CXL.mem.

FIG. 5 is a diagram showing a configuration of flits (protocol flit, all data flit) used in the CXL.mem.

The flits used in the CXL.mem include protocol flit ((A) of FIG. 5) and all data flit ((B) of FIG. 5). The protocol flit and all data flit are also used in the CXL.cache.

As shown in (A) of FIG. 5, the protocol flit includes one header slot (slot 0) and three generic slots (slots 1 to 3). Both the commands and data can be packed into the protocol flit. The all data flit is a flit whose slots are all configured by data, as shown in (B) of FIG. 5.

Figure 6:
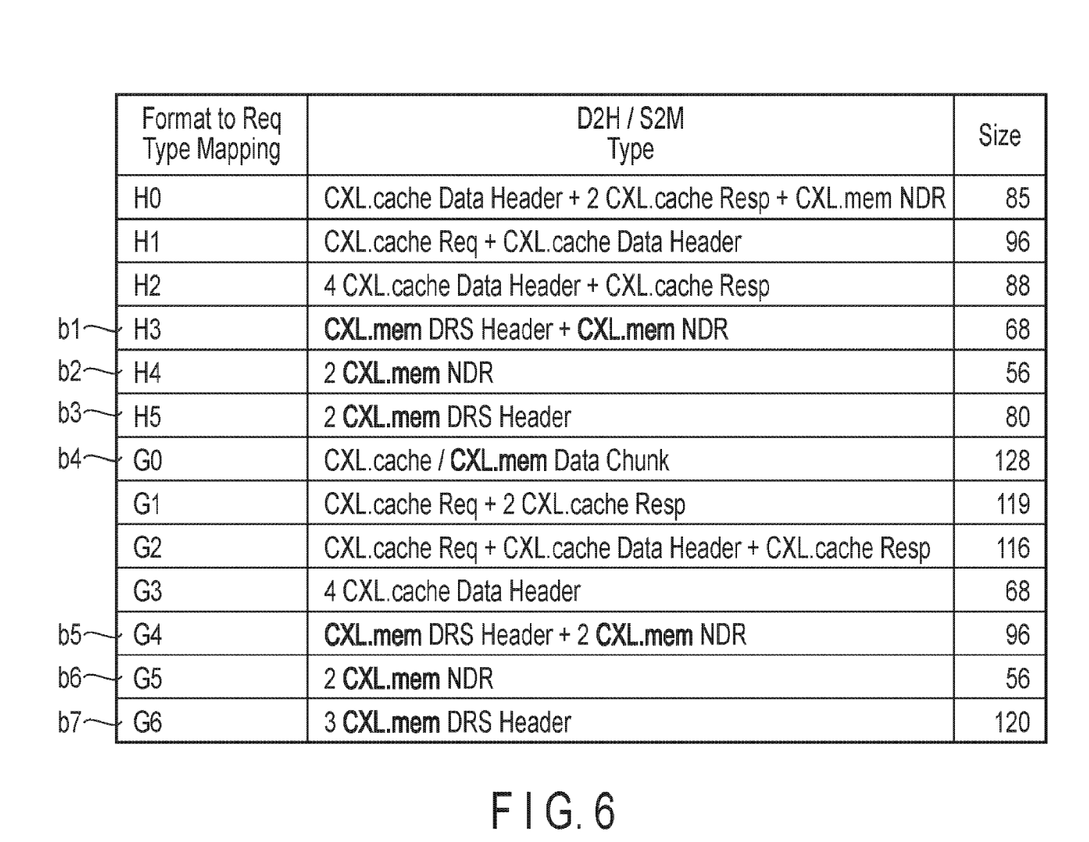
FIG. 6 is a diagram showing a list of formats (slot formats) that can be used with slots in the protocol flit or all data flit.

FIG. 6 is a diagram showing a list of formats (slot formats) that can be used with slots in the protocol flit or all data flit.

The slot formats include formats (H0 to H5) usable in the header slot and formats (G0 to G6) usable in the generic slot. G0 is also usable in the slots in all data flit. Among these formats, the formats related to the CXL.mem indicated by symbols b1 to b7 are used.

H3 is a format capable of packing one DRS item and one NDR item. H4 is a format capable of packing two NDR items. H5 is a format capable of packing two DRS items.

G0 is a format capable of packing 16-byte data. G4 is a format capable of packing one DRS item and two NDR items. G5 is a format capable of packing two NDR items. G6 is a format capable of packing three DRS items. G4 is not used in the memory system 1 of the present embodiment.

As described above, the transmit queue monitor 412 refers to the transmit queue 411 to acquire the remaining number of data slots of the DRS packed in the flit before the current flit, the remaining number of DRS and the remaining number of NDR. Based on the remaining number of data slots, the remaining number of DRS and the remaining number of NDR, which are acquired by the transmit queue monitor 412, and the number of empty slots of the current flit, the slot format selector 413 selects a slot format to be used for the slots in the current flit. With reference to the flowchart of FIG. 7, the efficient flit packing in the CXL link layer 32 of the memory system 1 of the present embodiment, which is achieved by the transmit queue monitor 412 and the slot format selector 413, will be described.

Figure 7:
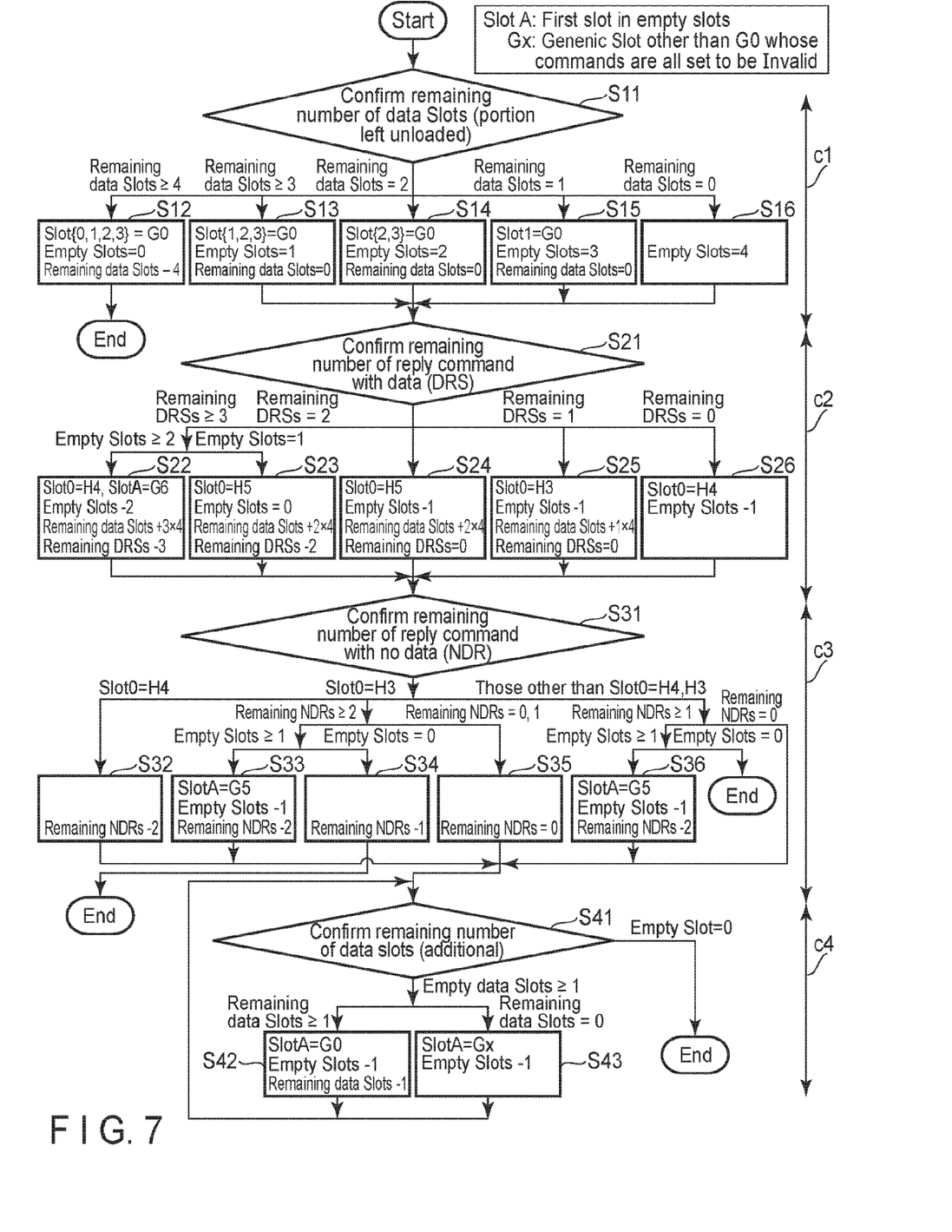
FIG. 7 is a flowchart showing a flow of flit packing in the CXL link layer of the memory system of the embodiment.

In FIG. 7, slot A represents a first slot (slot with the smallest number) in the empty slots, and Gx represents a generic slot other than G0 whose commands are all set to be invalid. Gx is, for example, slot G5 capable of packing two NDR items which are set to be invalid.

As shown in FIG. 7, the flit packing in the CXL link layer 32 of the memory system 1 of the present embodiment is roughly divided into four processes denoted by reference symbols c1 to c4.

First, in a first process (c1), the memory system 1 transmits the remaining data slots of the DRS packed in the protocol flit before the current Flit with the highest priority. The remaining number of data slots is acquired when the transmit queue monitor 412 refers to the transmit queue 411. The slot format selector 413 confirms the remaining number of data slots acquired by the transmit queue monitor 412 (step S11).

When the number of remaining data slots is four or more, the slot format selector 413 sets all of the four slots to slots G0 with the current flit as all data flit (step S12). The transmit Flit generator 414 packs the data into the four slots G0 selected by the slot format selector 413. In this step S12, the number of empty slots in the current flit is zero and thus the number of remaining data slots is reduced by 4. Since the number of empty slots in the current flit is zero, the packing into the current flit is terminated, with the result that the transmitter 41 transmits data to the CXL ARB/MUX layer 33 to start packing into the next flit.

When the remaining number of data slots is three or less, the slot format selector 413 selects G0 the number of which corresponds to the remaining number of data slots, which can be used in the generic slot, and which is capable of packing data, with the current flit as protocol data flit. The transmit Flit generator 414 packs the data (steps S13 to S16). In steps S13 to S16, the number of empty slots in the current flit is four—(the remaining number of packed data slots). The remaining number of data slots is zero. Since the number of empty slots in the current flit is not zero, the memory system 1 proceeds to a second process (c2). At this time, at least the header slot of the current flit has an empty space.

In the second process (c2), the memory system 1 selects a slot format such that the DRS queued by the upper CXL transaction layer and remaining in the transmit queue 411 can be packed to the maximum extent. The remaining number of DRS is acquired when the transmit queue monitor 412 refers to the transmit queue 411. The slot format selector 413 confirms the remaining number of DRS acquired by the transmit queue monitor 412 (step S21).

When the remaining number of DRS is three or more and the number of empty slots in the current flit is two or more, that is, when the generic slot as well as the header slot has an empty space, the slot format selector 413 selects H4 and one G6 (step S22). As shown in FIG. 6, H4 is a format capable of packing NDR and incapable of packing DRS. There are H3 and H5 as formats capable of packing DRS.

Nevertheless, the slot format selector 413 selects H4 as a dummy, and selects G6 capable of packing more three items of DRS than H3 and H5. The transmit Flit generator 414 packs three items of DRS into the G6. In this step S22, the number of empty slots in the current flit is decreased by two. The remaining number of data slots is increased by 12 (=3×4) because the three items of DRS are packed. The remaining number of DRS is decreased by three. Even though the number of empty slots in the current flit is decreased by two to zero, the packing into the current flit is not terminated, but the memory system 1 proceeds to the next third process (c3). This is because there is room for packing the NDR in H4 selected as a dummy. In the second process (c2), therefore, the memory system 1 does not determine whether to terminate the packing into the current flit. At this point, it is unclear whether the NDR is packed in the selected H4, and thus the NDR of H4 is set to be invalid.

When the remaining number of DRS is three or more and the number of empty slots in the current flit is one, that is, when only the header slot has an empty space, the slot format selector 413 selects H5 capable of packing more DRS from H3 and H5 capable of packing DRS (step S23). H5 is a format capable of packing 2 items of DRS, and the transmit Flit generator 414 packs two items of DRS into H5. In step S23, the number of empty slots in the current flit is zero. The remaining number of data slots is increased by 8 (=2×4) because two items of DRS are packed. The remaining number of DRS is decreased by two. As described above, since, in the second process (c2), the memory system 1 does not determine whether to terminate the packing into the current flit, it proceeds to the next third process (c3) even if the number of empty slots in the current flit is zero. Since, however, H5 is a format incapable of packing the NDR, the memory system 1 may determine at this point to terminate the packing into the current flit.

When the remaining number of DRS is two, the slot format selector 413 selects H5 capable of packing two items of DRS (step S24). The transmit Flit generator 414 packs two items of DRS into H5. In this step S24, the number of empty slots in the current flit is reduced by one. The remaining number of data slots is increased by 8 (=2×4) because two items of DRS are packed. The remaining number of DRS is zero. The number of empty slots in the current flit is reduced by one and thus is likely to become zero (in the case where the empty slot in the current flit is only the header slot at the time of transition to the second process (c2)). However, as described above, the memory system 1 does not determine whether to terminate the packing into the current flit, but, of course, at this point, the memory system 1 may determine it.

When the remaining number of DRS is one, the slot format selector 413 selects H3 capable of packing one item of DRS and one item of NDR (step S25). The transmit Flit generator 414 packs one item of DRS into H3. Since not H5 but H3 is selected, there is room for packing the NDR. At this point, it is unclear whether or not the NDR is packed into H3; thus, the NDR in H3 is set to be invalid. In this step S25, the number of empty slots in the current flit is decreased by one. The remaining number of data slots is increased by 4 (=1×4) because one item of DRS is packed. The remaining number of DRS is zero. Even though the number of empty slots in the current flit is decreased by one to zero, there is still room for packing the NDR into H3. The memory system 1 proceeds to the next third process (c3) without terminating the packing into the current flit.

When the remaining number of DRS is zero, the slot format selector 413 selects H4 capable of packing more NDR from H3 and H4 usable in the header slot and capable of packing NDR (step S26). At this point, it is unclear whether the NDR is packed into H4, and thus the NDR of H4 is set to be invalid. In this step S26, the number of empty slots in the current flit is decreased by one. Even though the number of empty slots in the current flit is decreased by one to zero, there is still room for packing the NDR into H4. The memory system 1 thus proceeds to the next third process (c3) without terminating the NDR packing into the current flit.

In the second process (c3), the memory system 1 selects a slot format such that the NDR queued by the upper CXL transaction layer and remaining in the transmit queue 411 can be packed to the maximum extent. The remaining number of NDR is acquired when the transmit queue monitor 412 refers to the transmit queue 411. The slot format selector 413 confirms the remaining number of NDR acquired by the transmit queue monitor 412 (step S31). When the memory system 1 selects a format capable of packing the NDR in the second process (c2), it preferentially uses the format. In other words, packing the NDR using the header slot takes precedence over packing the NDR using the generic slot.

When H4 is selected as the header slot (slot 0), the transmit Flit generator 414 packs up to two items of NDR into the H4 (step S32). It can be considered that the remaining number of NDR is three or more, but the slot format selector 413 does not add G4 or G5 which is a format capable of packing the NDR even if the generic slot has an empty space. This is because when H4 is selected, the remaining number of DRS could be three or more at the time of transition to the second process (c2) and in the next fourth process (c4), packing of the DRS in the second process (c2) takes precedence over packing of the NDR. In this step S32, the remaining number of NDR is decreased by two. When the remaining number of NDR is one or less at the time of transition to the third process (c3) and the remaining number of NDR is decreased by two to be less than zero, the remaining number of NDR is set to zero. The memory system 1 then proceeds to the next process (c4).

When H3 is selected as the header slot (slot 0), the remaining number of NDR is two or more, and the number of empty slots in the current flit is one or more, the slot format selector 413 selects G5, which is usable in the generic slot and capable of packing more NDR, from G4 and G5 and adds it for NDR packing (step S33). The transmit Flit generator 414 packs one item of NDR into H3 and also packs up to 2 items of NDR into G5. The reason for the addition of G5 is as follows. The selection of H3 means that the remaining number of DRS is one at the time of transition to the second process (c2). Under the conditions that the remaining number of NDR is two or more and the remaining number of DRS is zero, therefore, the advantage that the packing of DRS in the second process (c2) takes precedence over the packing of NDR in the fourth process (c4) is low. Even though the DRS packed in the second process (c2) is packed in the next fourth process (c4) in place of the addition of G5, all the data cannot be packed completely but are carried over to the next flit. That is, the advantage of giving precedence to the packing of DRS is low. In this step S33, the number of empty slots in the current flit is decreased by one. Though it may become zero, the determination as to whether the DRS packing into the current flit should be terminated is made in the next fourth process (c4). Of course, as the number of empty slots in the current flit is decreased by one, it may be determined whether the number of empty slots in the current flit becomes zero and then it may be determined whether the DRS packing into the current flit should be terminated. In this step S33, the remaining number of NDR is decreased by two. The memory system 1 then proceeds to the next fourth process (c4).

When H3 is selected as the header slot (slot 0), the remaining number of NDR is two or more, and the number of empty slots in the current flit is zero, the transmit Flit generator 414 packs one item of NDR into the H3 (step S34). In this step S34, the remaining number of NDR is decreased by one. Since the number of empty slots in the current flit is clearly zero, the memory system 1 terminates the NDR packing into the current flit. Accordingly, the transmitter 41 transmits data to the CXL ARB/MUX layer 33 to start packing into the next flit.

When H3 is selected as the header slot (slot 0) and the remaining number of NDR is zero or one, if there is NDR (if the remaining number of NDR is one), the transmit Flit generator 414 packs the NDR into the H3 (step S35). In this step S35, the remaining number of NDR is zero. The memory system 1 then proceeds to the next fourth process (c4).

When a format other than H3 and H4 capable of packing the NDR is selected as the header slot (slot 0), the remaining number of NDR is one or more, and the number of empty slots in the current flit is one or more, the slot format selector 413 selects G5 capable of packing more NDR from G4 and G5 usable in the generic slot and capable of packing the NDR (step S36). Specifically, the format other than H3 and H4 is H5. The transmit Flit generator 414 packs up to two items of NDR into the G5. In this step S36, the number of empty slots in the current flit is decreased by one. Though it may become zero, the determination as to whether the NDR packing into the current flit should be terminated is made in the next fourth process (c4). Of course, as the number of empty slots in the current flit is decreased by one, it may be determined whether the number of empty slots in the current flit becomes zero and then it may be determined whether the DRS packing into the current flit should be terminated. In this step S36, the remaining number of NDR is decreased by two. When the remaining number of NDR is one or less at the time of transition to the third process (c3) and when the remaining number of NDR is decreased by two to be less than zero, the remaining number of NDR is set to zero. The memory system 1 then proceeds to the next fourth process (c4).

When a format other than H4 or H3 is selected as the header slot (slot 0), the remaining number of NDR is one or more, and the number of empty slots in the current flit is zero, the memory system 1 terminates the NDR packing into the current flit. Accordingly, the transmitter 41 transmits data to the CXL ARB/MUX layer 33 to start packing into the next flit. Since the number of empty slots in the current flit is clearly zero, the memory system 1 terminates the packing into the current flit.

When a format other than H4 or H3 is selected as the header slot (slot 0) and the remaining number of NDR is zero, the memory system 1 performs no operation in the third process (c3) but proceeds to the next fourth process (c4).

In the fourth process (c4), the memory system 1 packs the DRS, which is packed into the current flit in the second process (c2), using the remaining empty slots. Note that the DRS is not necessarily packed in the second process (c2). The remaining number of data slots of the DRS is acquired when the transmit queue monitor 412 refers to the transmit queue 411. The slot format selecting unit 413 confirms the remaining number of data slots acquired by the transmit queue monitor 412 (step S41).

When the number of empty slots in the current flit is one or more and the remaining number of data slots is one or more, the slot format selector 413 selects G0 which is usable in the generic slot and capable of packing data. The transmit Flit generator 414 packs data into the G0 (step S42). In this step S42, the number of empty slots in the current flit is decreased by one, and the remaining number of data slots is also decreased by one. The memory system 1 then returns to step S41.

When the number of empty slots of the current flit is one or more and the remaining number of data slots is zero, the format selector 413 selects a generic slot other than G0 whose commands are all set to be invalid (step S43). For example, the format selector 413 selects G5 capable of packing two items of NDR and sets the two items of NDR to be invalid. This fills in the empty slots in the current flit. In this step S43, the number of empty slots in the current flit is decreased by one. The memory system 1 returns to step S41.

If the number of empty slots in the current flit becomes zero by repeating either or both of steps S42 and S43 or if the number of empty slots in the current flit is zero at the time of transition to the fourth process (c4), the memory system 1 terminates packing into the current flit. Accordingly, the transmitter 41 transmits data to the CXL ARB/MUX layer 33 to start packing into the next flit.

That is, the memory system 1 of the present embodiment determines a slot to be used from among four slots in the current flit in the order of (1) untransmitted data of DRS packed in the protocol flit before the current flit, (2) DRS, (3) NDR and (4) untransmitted data of DRS packed in the current flit. The memory system 1 also selects a slot format adaptively based on the remaining number of data slots, the remaining number of DRS, the remaining number of NDR and the number of empty slots in the current flit such that as much DRS and NDR as possible can be packed, thus achieving efficient packing into the flit in the CXL link layer 32.

Figure 8:
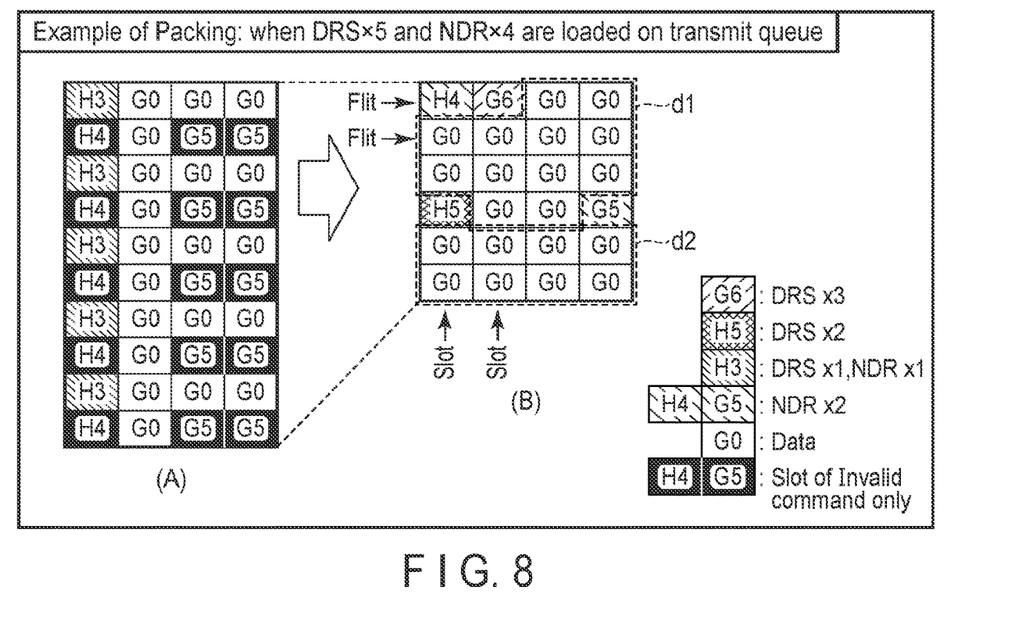
FIG. 8 is a diagram showing a first example of improving transmission efficiency by packing in the memory system of the embodiment.

FIG. 8 is a diagram showing a first example of improving transmission efficiency by packing in the memory system 1 of the present embodiment.

Assume in the first example that five items of DRS and four items of NDR are queued in the transmit queue 411 of the CXL link layer 32 by the upper CXL transaction layer 31.

In FIG. 8, (A) shows a comparative example of the memory system 1 of the present embodiment. This comparative example is an example in which all items of DRS are transmitted in the format of H3. In this comparative example, when one item of DRS and its data are transmitted, the next item of DRS and its data are transmitted. That is, in the comparative example, packing is performed in simple order such as first-in, first-out order.

In the comparative example, H3 is selected as a header slot of the first flit, which is capable of packing one item of DRS and one item of NDR, and one item of DRS and one item of NDR are packed in the H3. G0 is also selected for all three generic slots of the first flit, and data of the DRS packed in the H3 is packed in the G0. Since the data of the DRS is 64 bytes and requires four 16-byte slots, one slot of data is left. In the comparative example, therefore, in the second flit, for example, H4 whose commands are set to be invalid, is selected as the header slot, and G0 is also selected for, e.g., the initial one of the three generic slots, thereby to pack the data that cannot be packed in the first flit. At this time, there are two generic slots left. In the comparative example, for example, G5 whose commands are set to be invalid, is selected to fill the two generic slots that are empty slots.

Similarly, in the third flit, H3 and G0 are selected, DRS and NDR are packed therein, and three slots of data of the DRS are packed. In the next fourth flit, H4, G0 and two G5 are selected, and the remaining one slot of data is packed. Neither commands nor data is packed in the H4 or two G5. In addition, similar packing is performed in the fifth flit, sixth flit, seventh flit and eighth flit. The transmission of the four items of NDR is thus completed.

Subsequently, in the comparative example, H3 and G0 are also selected in the ninth flit, and only DRS is packed in the H3, and three slots of data of the DRS are packed. In the tenth flit, H4, G0 and two G5 are selected, and the remaining one slot of data is packed. The transmission of five items of DRS and their data is thus completed.

In FIG. 8, (B) shows an example of packing in the memory system 1 of the present embodiment. This packing follows the flowchart shown in FIG. 7.

Since the remaining number of DRS is three or more and the number of empty slots is two or more, the memory system 1 first selects H4 incapable of packing DRS for the header slot of the first flit and selects G6 capable of packing three items of DRS for one of the three generic slots of the first flit. The memory system 1 also selects G0 for the remaining two generic slots. As a result, in the first flit, two items of NDR are packed in the H4 and three items of DRS are packed in the G6. Two slots of data of the initial one of the three items of DRS packed in the G6 are packed in the two G0. Ten (=3×4−2) slots of data are left here.

At the time of packing into the second and third flits, the remaining number of data slots is four or more. The memory system 1 thus sets these flits as all data flit to pack data in all of the four data slots. Accordingly, the remaining number of data slots is two. At the time of packing into the fourth flit, therefore, the memory system 1 sets the fourth flit as protocol flit to select G0 for two of the three generic slots and pack the remaining two slots of data. Twelve G0 indicated by broken line d1 are selected to pack data of three items of DRS packed in G6 of the first flit.

As the header slot, H5 is selected because the remaining number of DRS is two. As the remaining one generic slot, G5 is selected because H5 is selected and the remaining number of NDR is one or more. Accordingly, the remaining two items of DRS are packed in H5 and the remaining two items of NDR are packed in G5. The transmission of five items of DRS and four items of NDR is thus completed. On the other hand, eight (=2×4) slots of data of two items of DRS packed in H5 are left.

At the time of packing into the fifth and sixth flits, the remaining number of data slots is four or more. The memory system 1 thus sets these flits as all data flit to pack data in all of the four data slots. Eight G0 indicated by broken line d2 are selected to pack data of two items of DRS packed in H5 of the fourth flit. The transmission of data of the DRS is also completed.

In the first example, the packing in the memory system 1 of the present embodiment can decrease ten flits in the comparative example to six flits and thus reduce the transmission time by 40%. In other words, the transmission efficiency can be improved by 67%.

Figure 9:
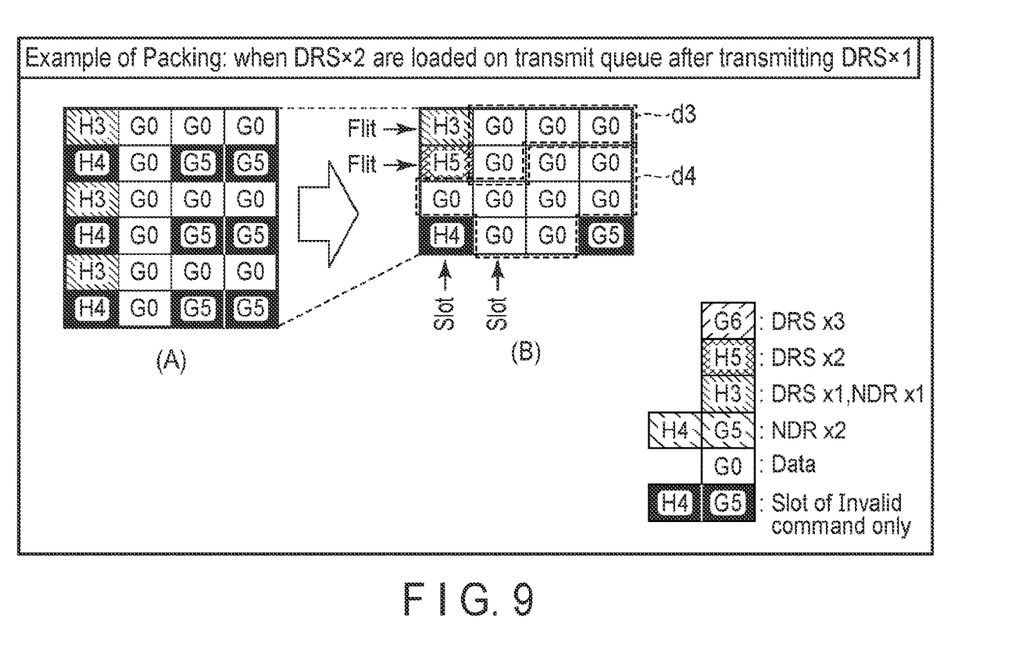
FIG. 9 is a diagram showing a second example of improving transmission efficiency by packing in the memory system of the embodiment.

FIG. 9 is a diagram showing a second example of improving transmission efficiency by packing in the memory system 1 of the present embodiment.

Assume in the second example that when one item of DRS is transmitted, two items of DRS are queued in the transmit queue 411 of the CXL link layer 32 by the upper CXL transaction layer 31.

In FIG. 9, (A) shows a comparative example of the memory system 1 of the present embodiment. This comparative example is also an example in which all items of DRS are transmitted in the format of H3. In this comparative example, too, when one item of DRS and its data are transmitted, the next item of DRS and its data are transmitted. That is, in the comparative example, too, packing is performed in simple order such as first-in, first-out order.

In the comparative example, H3 is selected as a header slot of the first flit, and DRS is packed in the H3. G0 is also selected for all three generic slots of the first flit, and data of the DRS packed in the H3 is packed in the G0. One slot of data is left here.

In the second example, two items of new DRS is generated. In the comparative example where DRS is packed in simple order, however, one slot of remaining data is packed in the second flit. In the comparative example, data of the first DRS is transmitted, and then one of the two items of new DRS and its data are transmitted by the third and fourth flits. The other item of new DRS and its data are transmitted by the fifth and sixth flits.

In FIG. 9, (B) shows an example of packing in the memory system 1 of the present embodiment. This packing also follows the flowchart shown in FIG. 7.

Since the remaining number of DRS is one, the memory system 1 first selects H3 as the header slot of the first flit. The memory system 1 also selects G0 for three generic slots of the first flit in order to pack data of the DRS packed in the current flit. One slot of data is left here. This process is the same as that of the comparative example.

In the second example, two items of new DRS are generated. With respect to the second flit, the memory system 1 first selects G0 for one of the three generic slots to pack one slot of remaining data. Four items of G0 indicated by broken line d3 are selected to pack data of the DRS packed in H3 of the first flit. Since the remaining number of DRS is two, the memory system 1 then selects H5 capable of packing two items of DRS for the header slot of the second flit. Furthermore, the memory system 1 selects G0 for the remaining two generic slots of the second flit in order to pack data of the DRS packed in the current flit. The DRS transmission is thus completed. On the other hand, six (=2×4−2) slots of data of the two items of DRS packed in H5 are left.

At the time of packing into the third flit, the remaining number of data slots is four or more. The memory system 1 thus sets these flits as all data flit to pack data in all of the four data slots. At the time of packing into the fourth flit, the memory system 1 selects G0 for two of the three generic slots to pack the remaining two slots of data. Eight G0 indicated by broken line d4 are selected to pack data of two items of DRS packed in H5 of the second flit. The memory system 1 embeds H4, G5 and the like whose commands are set to be invalid for the header slot and one generic slot remaining as empty slots.

In the second example, the packing in the memory system 1 of the present embodiment can decrease six flits in the comparative example to four flits and thus reduce the transmission time by 33%. In other words, the transmission efficiency can be improved by 50%.

As described above, in the memory system 1 of the present embodiment, a slot format is adaptively selected on the basis of the remaining number of data slots, the remaining number of DRS, the remaining number of NDR and the number of empty slots in the current flit, thereby achieving efficient packing into flits in the CXL link layer 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host as a type 3 compute express link (CXL) device via an interface conforming to a CXL standard, the memory system comprising:
   a nonvolatile memory; and
   a controller configured to control writing of data to the nonvolatile memory or reading of data from the nonvolatile memory in response to a command from the host,
   wherein the controller is configured to:
      pack, at a CXL link layer, a response command with data (DRS: data response) and/or a response command without data (NDR: no data response), received from an upper CXL transaction layer, into a flit including four slots, and transmit the response command to a lower CXL ARB/MUX layer; and
      select, based on a remaining number of data slots of DRS packed in a first flit that has been transmitted to the CXL ARB/MUX layer, a remaining number of DRS, a remaining number of NDR, and a number of empty slots in a second flit to be transmitted subsequently to the CXL ARB/MUX layer, a format to be used in slots in the second flit.

2. The memory system of claim 1, wherein the controller is configured to determine a slot to be used for packing from among four slots in the second flit in order of untransmitted data of DRS packed in the first flit, DRS, NDR and untransmitted data of DRS packed in the second flit.

3. The memory system of claim 2, wherein when the controller packs DRS into the second flit in the case where the remaining number of DRS is three or more and the number of empty slots in the second flit is two or more, the controller is configured to select a format which is incapable of transmitting DRS in a format usable in a header slot for an initial slot in the second flit and which is capable of transmitting a maximum number of NDR, and select a format which is capable of transmitting a maximum number of DRS in a format usable in a generic slot for one slot other than the initial slot in the second flit.

4. The memory system of claim 3, wherein the controller is configured to use the initial slot in the second flit for which the format which is incapable of transmitting DRS in a format usable in a header slot and which is capable of transmitting a maximum number of NDR has been selected, to pack NDR into the second flit.

5. The memory system of claim 2, wherein the controller is configured to use an initial slot in the second flit for which the format which is incapable of transmitting DRS in a format usable in a header slot and which is capable of transmitting a maximum number of NDR has been selected, to pack NDR into the second flit.

6. The memory system of claim 1, wherein when the controller packs DRS into the second flit in the case where the remaining number of DRS is three or more and the number of empty slots in the second flit is two or more, the controller is configured to select a format which is incapable of transmitting DRS in a format usable in a header slot for an initial slot in the second flit and which is capable of transmitting a maximum number of NDR, and select a format which is capable of transmitting a maximum number of DRS in a format usable in a generic slot for one slot other than the initial slot in the second flit.

7. The memory system of claim 4, wherein the controller is configured to use the initial slot in the second flit for which the format which is incapable of transmitting DRS in a format usable in a header slot and which is capable of transmitting a maximum number of NDR has been selected, to pack NDR into the second flit.

8. The memory system of claim 1, wherein the controller is configured to use an initial slot in the second flit for which the format which is incapable of transmitting DRS in a format usable in a header slot and which is capable of transmitting a maximum number of NDR has been selected, to pack NDR into the second flit.

9. A controlling method of a type 3 compute express link (CXL) device including an interface conforming to a CXL standard, the method comprising
   packing, at a CXL link layer of the type 3 CXL device, a response command with data (DRS: data response) and/or a response command without data (NDR: no data response), received from an upper CXL transaction layer, into a flit including four slots, and transmitting the response commands to a lower CXL ARB/MUX layer,
   wherein the packing includes selecting, based on a remaining number of data slots of DRS packed in a first flit that has been transmitted to the CXL ARB/MUX layer, a remaining number of DRS, a remaining number of NDR, and a number of empty slots in a second flit to be transmitted subsequently to the CXL ARB/MUX layer, a format to be used in slots in the second flit.

10. The controlling method of claim 9, wherein the packing further includes determining a slot to be used for packing from among four slots in the second flit in order of untransmitted data of DRS packed in the first flit, DRS, NDR and untransmitted data of DRS packed in the second flit.

11. The controlling method of claim 9, wherein the packing further includes selecting, when packing DRS into the second flit in the case where the remaining number of DRS is three or more and the number of empty slots in the second flit is two or more, a format which is incapable of transmitting DRS in a format usable in a header slot for an initial slot in the second flit and which is capable of transmitting a maximum number of NDR, and selecting a format which is capable of transmitting a maximum number of DRS in a format usable in a generic slot for one slot other than the initial slot in the second flit.

12. The controlling method of claim 9, wherein the packing further includes using an initial slot in the second flit for which the format which is incapable of transmitting DRS in a format usable in a header slot and which is capable of transmitting a maximum number of NDR has been selected, to pack NDR into the second flit.

* * * * *